March 19, 1940. G. LAVENBURG 2,193,972
ELECTRIC TOASTER
Filed Jan. 12, 1939 3 Sheets-Sheet 1
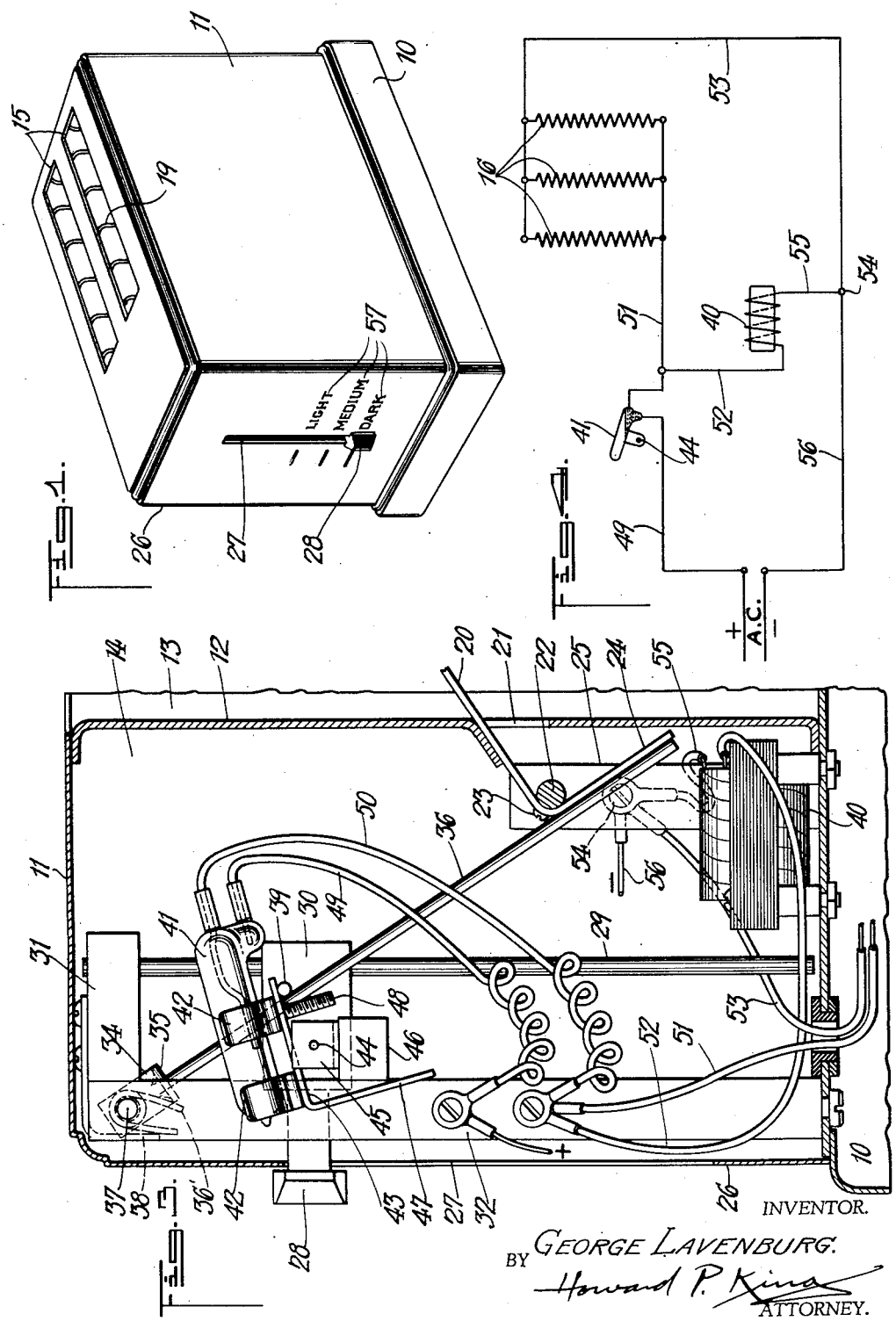
INVENTOR.
BY GEORGE LAVENBURG.
Howard P. King
ATTORNEY.

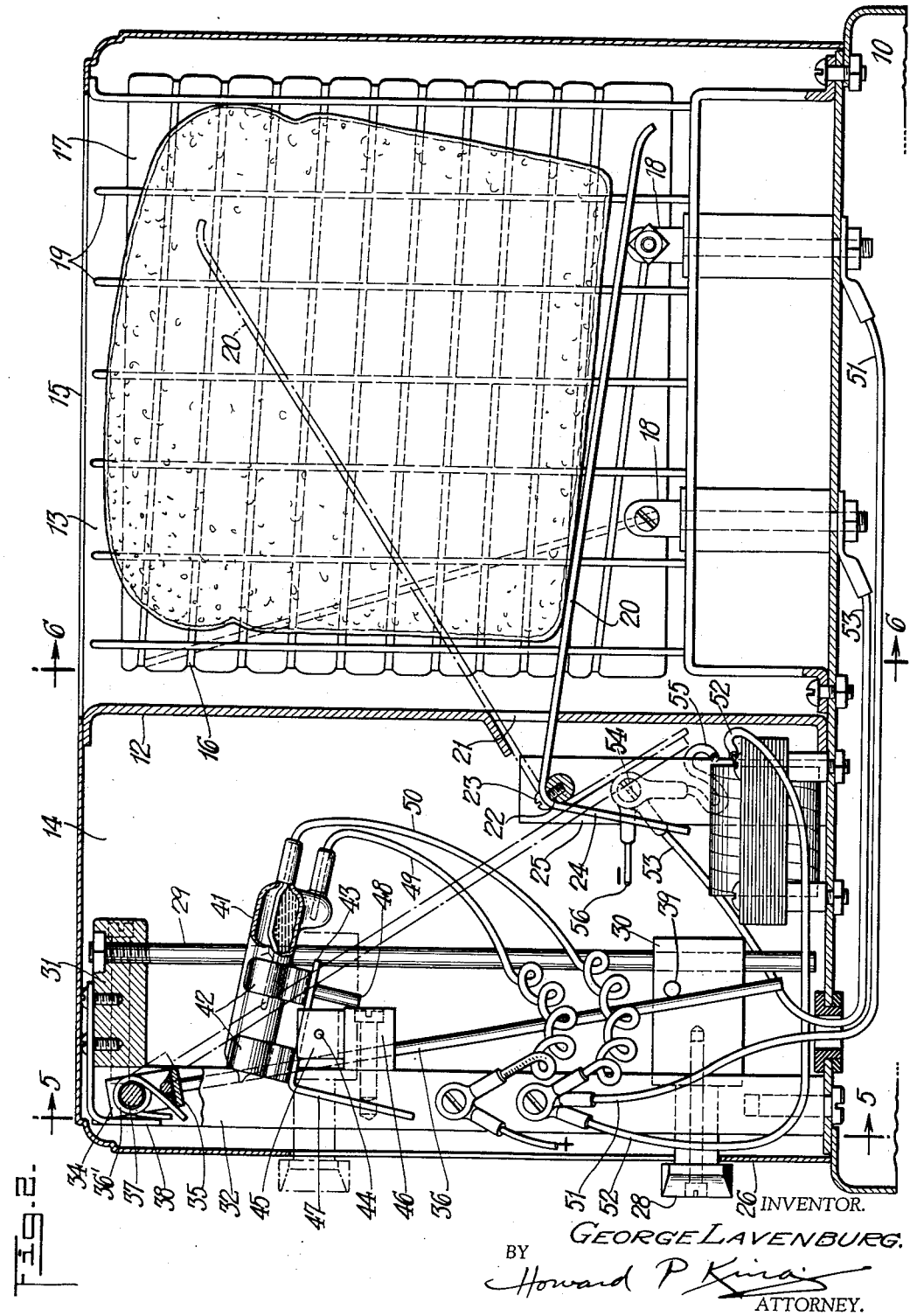

March 19, 1940.   G. LAVENBURG   2,193,972
ELECTRIC TOASTER
Filed Jan. 12, 1939   3 Sheets-Sheet 3
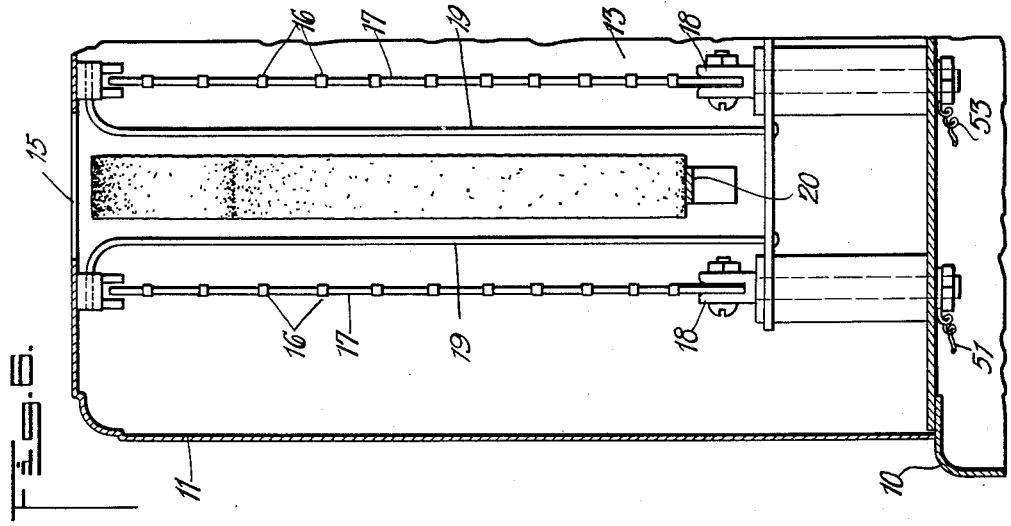
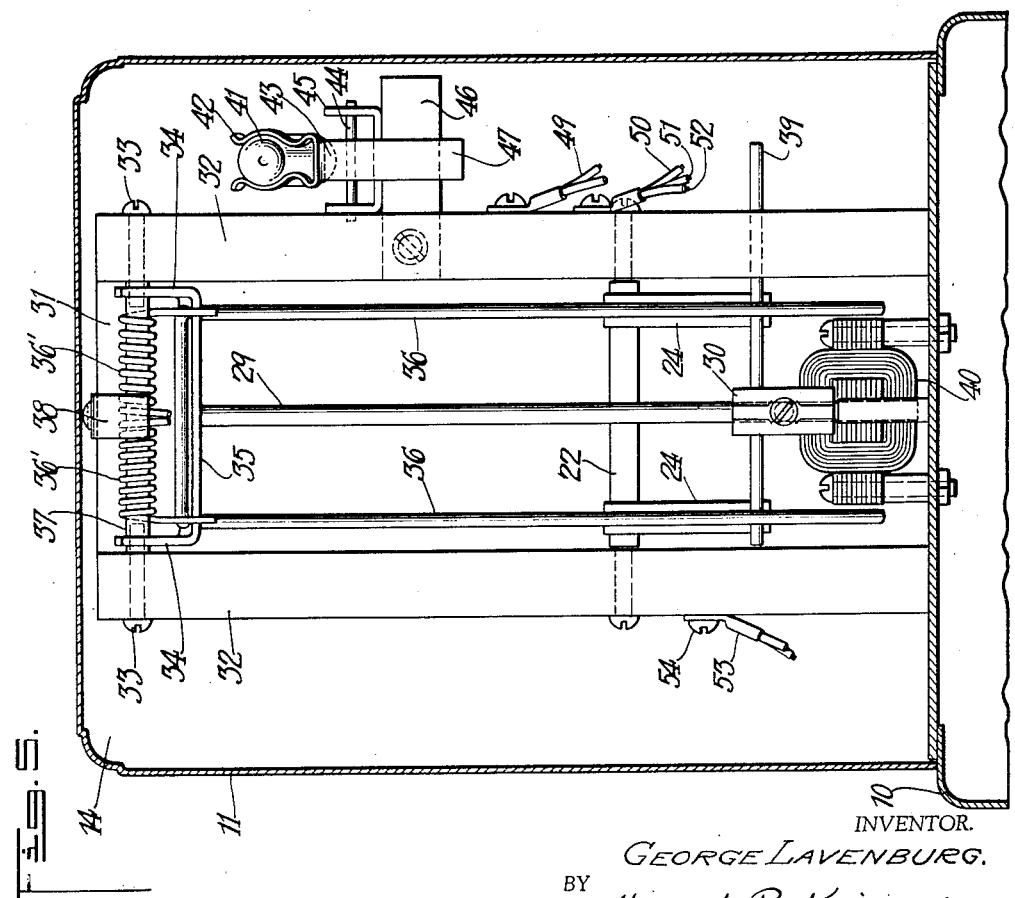
INVENTOR.
GEORGE LAVENBURG.
BY
Howard P. King
ATTORNEY.

Patented Mar. 19, 1940

2,193,972

UNITED STATES PATENT OFFICE 2,193,972

ELECTRIC TOASTER

George Lavenburg, New York, N. Y.

Application January 12, 1939, Serial No. 250,492

7 Claims. (Cl. 161—16)

This invention relates to electric toasters, and particularly to a novel timing means, and constitutes an improvement upon my prior Patents 2,046,471 and 2,046,472 of July 7, 1936, and upon my allowed application Ser. No. 96,793 filed August 19, 1936.

In my said prior patents and application are shown means for effecting a gradual actuation of the platform and toast during the toasting operation. In each instance the timing structure is in constant connection with and exerting a constant influence upon the timed element or platform. In each instance, also, the connection is through the instrumentality of a flexible cable. The present invention, on the other hand, is directed to the physical separation of the timed element from constant connection with the timing element for enabling the toast to remain in fixed position during its toasting and to be ejected violently when toasted, and to avoid the necessity for and use of a flexible cable.

Further objects of my present invention are to enable the toasting operation to be conveniently set for long or short periods as desired and to shut off the heater and timing currents at the end of any such period; to accomplish all setting and switching operations required of the operator by a single act on the part of the operator; to provide for rectilinear movement of the operating handle; to enable the operator to move the handle either for starting or manually stopping operation of the toaster; to employ the handle as an indicator both as to character of toast to be obtained and as to how nearly complete the operation may be at any moment; to provide a substantially rigid bar which may be pulsated imperceptibly to the eye, with a slide thereon and held from lateral displacement therefrom; to utilize said bar as an armature for directly receiving pulsations from a magnet; to avoid any change of timing resultant from different weight of bread being toasted; to reduce the working parts to a minimum and enable parts employed to be rugged; to secure simplicity of construction and operation; and to obtain other advantages and results as may be brought out in the following description.

Referring to the accompanying drawings in which like numerals of reference indicate similar parts throughout the several views:

Figure 1 is a perspective view of a toaster embodying my invention;

Figure 2 is a longitudinal vertical section of the same showing the parts in positon at the commencement of the toasting operation for securing a dark piece of toast;

Figure 3 is a similar sectional view of the operating portion of the mechanism and showing the parts in normal or non-toasting position;

Figure 4 is a wiring diagram of the electric circuits involved;

Figure 5 is a sectional view looking rearward toward the operating mechanisms and taken on a plane inside the front wall of the housing; and Figure 6 is a vertical cross section of one oven as upon line 6—6 of Figure 2.

In the specific embodiment of the invention illustrated in said drawings, the reference numeral 10 designates a suitable base on which is carried a housing 11. The interior of this housing is divided by a partition 12 into a compartment 13 toward the rear of the housing which constitutes the oven and a compartment 14 toward the front of the housing which comprises the enclosure for the operating mechanism. According to the present showing two slots or openings 15 are provided in the top of the housing extending in a direction from front to back of the oven portion of the housing in parallel relation to each other and enabling the two pieces of bread to be inserted therein for toasting purposes. A single operating mechanism is provided for lifting both pieces of toast at one time when the toasting operation is completed according to the present illustration, but it will be understood that I may employ as many toast receiving openings as desired and as many operating units as may be desired or necessary in connection therewith. Since the particular showing of a single unit for operating to eject two pieces of toast at one time has been selected for the specific embodiment of the invention herein, the description will be directed more particularly to the precise showing in order to make the description clear and definite; however, neither from the showing in the drawings nor the description thereof is there any purport to utilize the same by way of limitation but only as a specific example of the broader concept of the invention.

The oven contains toasting elements 16 here shown as resistance wires coiled upon insulatory plates, such as mica 17, in turn mounted in upright position by suitable supports 18 which may also conveniently constitute the connecting terminals for the incoming current to the heater. The said plates 17 with heater elements 16 thereon are preferably parallel to each other and situated within housing 11 at the sides of openings 15 so the bread, when introduced into the oven, will have a heater element on each side thereof. The bread is kept from contacting the heating element by any suitable means, such as the vertical guards 19 illustrated.

Movable support 20 is provided below each oven opening 15 for the bread to rest upon while being toasted. This support preferably is situated in an upwardly sloping position as indicated in dotted lines in Figure 2 and in full lines in Figure 3 when the operating mechanisms are at rest and the current shut off. While the bread is being toasted, the said support is permitted to swing to a downwardly inclining position, as shown in Figure 2 and retains that position until the toasting operation is completed, at which time said support is impelled back to its upwardly inclined position to substantially eject the toast from the oven. As here shown, said support 20 is a bar or strip of suitable material, such as aluminum with the forward portion thereof projecting through a slot 21 in partition 12 into the mechanism chamber 14. Said bar there bends downwardly over a rocker shaft 22 to which it may be secured by any suitable means such as screw 23 here shown, said bar having its forward end bent downwardly to provide leg 24, the function of which will be hereafter explained. The amplitude of swing permitted for the said support may be confined by any suitable stops, and the present showing illustrates the ends of slot 21 through partition 12 functioning in that respect. Furthermore, since both supports are mounted on rocker shaft 22, they will both move simultaneously. Said rocker shaft is suitably supported near its ends as by means of posts 25 situated near the partition and standing upright from base 10 within the mechanism compartment 14.

The front 26 of the housing preferably is substantially in a vertical plane and provides a central and vertically disposed slot 27 therein through which projects a finger piece or handle 28. Within the mechanism compartment 14 of the housing is situated a vertically disposed rod 29 parallel to and behind the slot in spaced relation therefrom. A slider 30 is mounted upon this vertically disposed rod and said finger piece 28 is preferably secured to said slider. It will accordingly be noted that the slider and finger piece have a rectilinear amplitude of movement in a vertical direction and the distance which the slider may move is limited by engagement of the finger piece or handle with the top and bottom of slot 27. One end of rod 29 is made fast in any suitable manner whereas the other end is free to vibrate. According to the present showing the end which is made fast is toward the top of the toaster, and is shown threaded for mounting with respect to a fixed and preferably insulatory head 31 in turn firmly attached to a pair of posts 32 projecting upwardly from the base or bottom of the housing so that the posts are parallel to the said rod 29. Said posts likewise give support to suitable trunnions such as screws 33 projecting toward each other through the posts in horizontal alinement, said trunnions in turn supporting the legs 34 of a yoke, the middle portion 35 of which extends horizontally from leg to leg and in a situation beneath the axial line of said trunnions 33, 33. Furthermore, said yoke provides means for attachment of a pair of spring pressed levers 36, 36. As here shown said levers comprise long legs of a U-shaped member struck from a single piece of heavy wire with the cross portion of the U-shaped member lying longitudinally against the inside of the cross member 35, said yoke having holes near the ends of said cross member through which the said levers 36, 36 project downwardly so that the levers and yoke are, for purposes of this invention, securely united and function as a single mechanism. The said U-shaped member and yoke may be soldered, brazed or otherwise attached one to the other for preventing any relative displacement with respect to each other. Furthermore, it will now be observed that the two said levers 36, 36 depend at proper positions so as to be in front of depending legs 24, 24 of the bread supports 20, 20, and when said levers are swung to their most rearward position they engage said legs 24, 24 and swing the bread supports to the upwardly inclined position as shown best in Figure 3. A pair of coil springs are situated on a core 37 carried by the inwardly projecting ends of trunnions 33, 33, one end of each spring being held against displacement by a suitable stop 38 and the other end of each spring bearing against cross member 35 of the yoke preferably in the vicinity of the respective levers 36, 36. Proper tension is given to said springs for controlling the levers and to produce the necessary force to swing the bread support upwardly and forcibly eject the bread from the oven.

Said levers 36, 36, in addition to performing the function of operating the bread support for ejectment of the bread also function as part of the timing mechanism. In the accomplishment of this last mentioned function, the said levers 36, 36 have a sliding engagement with cross bar 39 which is rigidly mounted in slider 30 and projects from opposite sides thereof across the path of movement of said levers. It is now appropriate to call attention to the fact that said cross bar 39 is slightly forward of the vertical rod 29 and that the trunnion support 33, 33 for said levers is even further forward so that said levers are always sloping with respect to said vertical rod 29. When the slider 30 is in its lowermost position, levers 36, 36 have a small angle of slope with respect to said rod, but as the slider approaches its uppermost position, the angle between the levers and the rod becomes greater. Accordingly, the moment of force acting in a vertical direction upon cross bar 39 from the spring pressure applied by the levers 36, 36 increases as the slider moves from its lowermost towards its uppermost position. With the increase of the moment of force in a vertical direction there is a corresponding decrease of the moment of force in a horizontal direction, and as a result the frictional engagement between the slider and the rod due to lateral pressure exerted by the springs decreases during upward movement of the slider until finally the vertical moment of force exceeds the frictional resistance and the slider is then forced quite freely through the final stage of its permitted movement and it is during that stage of movement that the lower end of the lever engages leg 24 and consequently forcibly ejects the toast from the oven.

The moment of force acting vertically upon the cross bar 39, except at the final stage of movement of the slider, is insufficient by itself to overcome the friction between the slider and vertical rod 29. However, I provide means for pulsating the said rod during the toasting operation and thereby disturb the frictional engagement between said slider and rod sufficiently to enable the vertically directed moment of force to be effective upon the slider and thus enable the spring pressed levers 36, 36 to gradually move the slider toward its uppermost position. I therefore emphasize that the spring pressed levers, rod 29 and slider 38 cooperate to establish two periods, the first of which is characterized by a slow movement of the slider and constitutes the timing period, whereas the second period is characterized by a quick movement of the slider and may be termed the ejecting period. Repeated operation of the toaster has established the fact that the timing period of the slider from its bottom position to its uppermost position will be very accurate and it is equally established that the ejecting period occupies such a short time or small proportion of the entire time of movement of the slider that it may be properly said that the toast is instantaneously ejected upon the completion of the timing period.

Next the lower free end of the rod 29 is situated an iron core magnet 40 to which alternating current is supplied. The pulsations of the current acting through the magnet upon vertical rod 29 sets up corresponding pulsations therein. In utilizing the said rod 29 as an armature as just described, it is preferred that the same be of iron or other suitable material responsive to the magnetic influence of magnet 40. It is also preferred that said rod shall be substantially rigid, such that its pulsations are not visible to the eye although evidence of such pulsations being present may be felt by touching the rod while magnet 40 is in operation.

The current to the magnet 40 and to the heating coils 16 is preferably under control of a single switch, said switch being automatically closed when the operator depresses the finger piece and automatically opened when the slider moves to its uppermost position. As here shown, a mercury switch 41 is provided, the same being mounted in clips 42, 42, of a rocker support 43. This rocker support is trunnioned upon an axle 44 carried in a suitable mounting 45 in turn supported upon a bracket 46 secured to one of the front posts 32 heretofore described. The rocker support 43 provides a depending tongue 47 at its forward end suitably arranged to act as a stop and limit the tilting of the mercury switch in suitable manner in one direction. Likewise towards the rear of the said rocker support depends another stop 48 which limits swinging thereof in the other direction. Both of these stops 47 and 48 are shown as engaging bracket 46 in performing the stopping function for the rocker support. The incoming current passes through the mercury switch in series, as through a wire 49 to another wire 50 which connects both with a wire 51 to the heaters and another wire 52 to the magnet. At the other side of the heaters is a return wire 53 which joins at 54 with the return wire 55 from the magnet and thence back through a return wire 56 to the power line. The mercury switch is preferably operated during the final upward movement of the slider, that is, during the toast ejecting period, and functions to shut off the current to the heaters and current to the magnet simultaneously. When the finger piece is depressed, the mercury switch swings by gravity or otherwise to thereby turn the current on both for the heaters and for the magnet at substantially the position of the slider where pulsation is required to obtain upward sliding of the slider should the operator release the finger piece at such position. Accordingly, no matter to what position the operator depresses the finger piece and then lets go, the mechanism will function immediately and the slider will begin its upward movement. Likewise, the initial depression of the finger piece promptly disengages the levers 36, 36 from the leg 24 and the toast support and consequently the toast support will resume its lowermost position promptly upon initial depressing movement of the finger piece and in any event will be in its lowermost position when the slider is depressed to an extent sufficient to turn on the current. It will be observed, therefore, that the operator need not depress the finger piece all the way to the bottom unless he wishes to do so. If the finger piece is depressed only partway, but far enough to turn on the switch, the toast support is likewise in its lower position and toasting will take place, but only in proportion to the distance which the slider must travel through the timing period. I take advantage of this variable length of time of the period to obtain light, medium or dark toast, and have indicated suitable designations 57 adjacent the finger piece 28 on the front 26 of the housing to which the operator may slide the finger piece for the character of toast desired. The operator thus has a definite indication of the character of the toast to be obtained and the timing means is required to function only for the particular period selected and the toast ejected at the end of such period whether it be the shortest, longest or intermediate period. Furthermore, the operator, by observing the position of the finger piece at any time may ascertain how nearly completed the toasting operation may be by observing how near the top of the slot the finger piece is situated at the moment.

I claim:

1. A timing element comprising a vibratory rod, a slide on the rod, and a lever pressing against the slide at constantly changing angles as the slide moves thereby exerting a moment of force longitudinally of the rod and a moment of force in the direction of pulsation transverse to the rod, the moment of force in the direction of pulsation of the rod always being greater than the moment of force longitudinal of the rod, said lever and rod always being at acute angles with respect to each other and with the lesser moment of force of the lever on the slide in the direction of sliding and increasing as the sliding progresses.

2. A timing element comprising a substantially rigid rod secured at one end and free at its other end, magnetic means for pulsating said rod transverse to its entire length, a slide on the rod, and means pressing with a moment of force in the direction longitudinally of the rod and with a greater moment of force in the direction of pulsation of the rod for sliding said slide for a part of the length of said rod under influence of the pulsations established in the rod by said magnetic means.

3. A timing element comprising a substantially rigid rod secured at one end and free at its other end, pulsating means for pulsating said rod transverse to its entire length, a slide on the rod, and means pressing with a moment of force in the direction longitudinally of the rod and with a greater moment of force in the direction of pulsation of the rod for sliding said slide for a part of the length of said rod under influence of the pulsations established in the rod by said pulsating means.

4. A timing and ejecting mechanism comprising an element to be moved, a pulsatable rod, means for pulsating said rod in a direction transverse to its length, means responsive to pulsations of said rod and movable lengthwise of the rod in a direction transverse to the pulsations for establishing a timing period and an ejecting period, and means under control of said pulsation responsive means having a rapid final movement when the responsive means is near one end of the rod for moving the element during said ejecting period.

5. A timing and ejecting mechanism comprising in combination with an element to be moved, of a spring pressed lever, a pulsating bar and a slide on said bar engaged and slowly advanced by said lever and simultaneously restraining said lever during a timing period from contacting said element, said slider permitting said lever during an ejecting period to contact said element and permitting said spring to thereupon actuate said lever more rapidly and apply rapid actuation to said element.

6. A timing and ejecting mechanism in combination with an element to be moved, of a lever, a pulsating bar and a slider on said bar engaged and slowly advanced by said lever and simultaneously restraining said lever during a variable timing period from contacting said element, and said slider permitting said lever during an ejecting period to contact said element and thereupon permitting said lever to be actuated more rapidly with the lever thereupon applying rapid actuation to said element, said lever, pulsating bar and slider remaining at all times in operative physical contact with each other.

7. A timing and ejecting mechanism comprising in combination with an element to be moved, of a spring pressed lever and a slider slowly advanced by said lever and simultaneously restraining said lever during a variable timing period from contacting said element, said slider permitting said lever during an ejecting period to contact said element and permitting said spring to thereupon actuate said lever more rapidly and apply rapid actuation to said element, said spring retaining said lever at all times in operative physical contact with said slider.

GEORGE LAVENBURG.